March 30, 1937.  C. R. PATON  2,075,085
MOTOR VEHICLE
Filed April 20, 1934  3 Sheets-Sheet 2

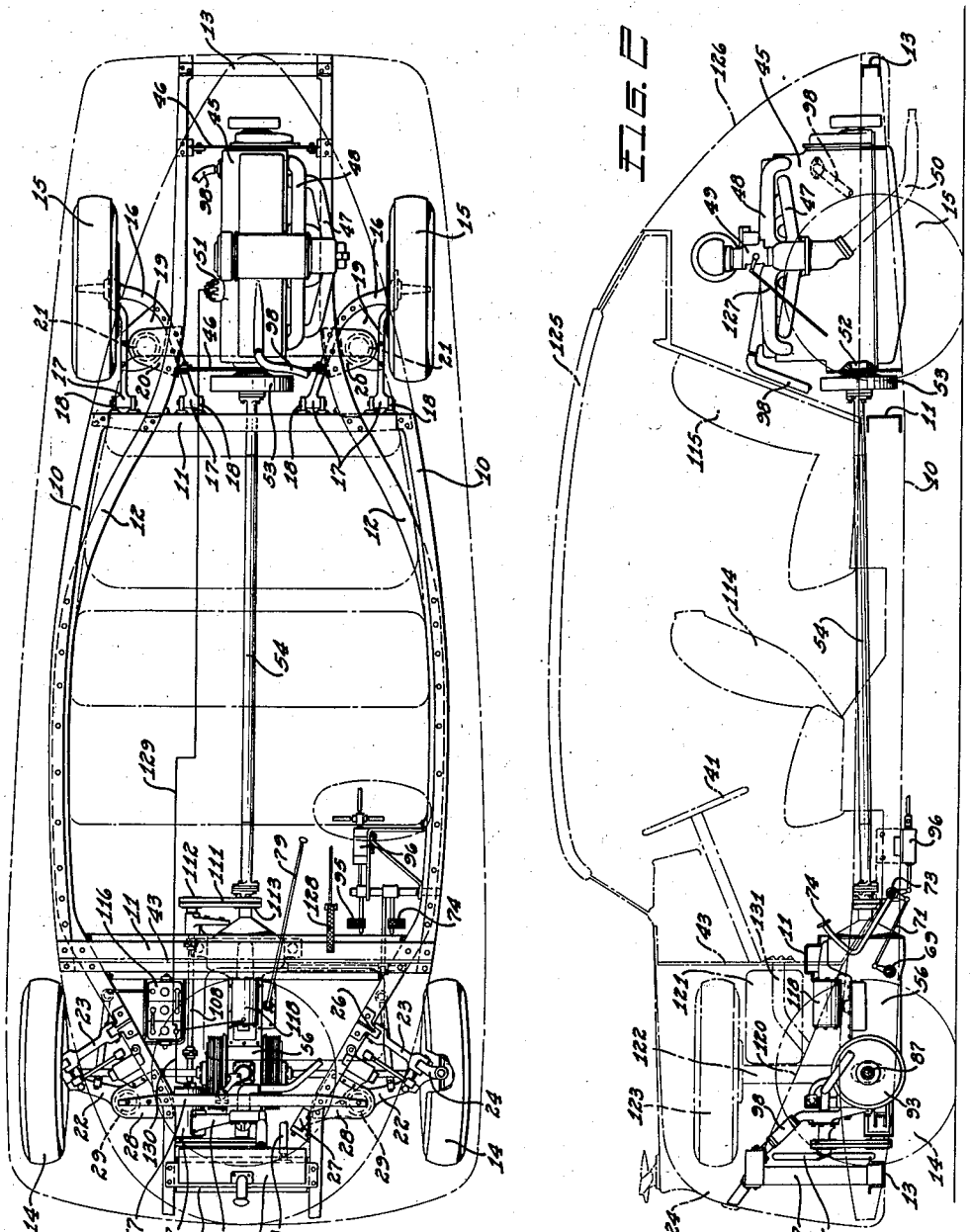

Inventor
CLYDE R. PATON.
By Milton Tibbles
Attorney

March 30, 1937.  C. R. PATON  2,075,085
MOTOR VEHICLE
Filed April 20, 1934  3 Sheets-Sheet 3

Inventor
CLYDE R. PATON.
By Milton Tibbetts
Attorney

Patented Mar. 30, 1937

2,075,085

UNITED STATES PATENT OFFICE 2,075,085

MOTOR VEHICLE

Clyde R. Paton, Birmingham, Mich., assignor to Packard Motor Car Company, Detroit, Mich., a corporation of Michigan Application April 20, 1934, Serial No. 721,506

21 Claims. (Cl. 180—54)

This invention relates to motor vehicles and more particularly to vehicles having the front steering wheels driven by an engine located at the rear.

A vehicle having the front steering wheels driven by a rear engine, as compared with a vehicle having the rear wheels driven by a forward engine, gives greater safety and comfort and better performance. As a front driven vehicle is pulled by the front wheels instead of being pushed by the rear wheels, the tendency to side sway or skid is minimized due to the natural tendency of the trailing end of the vehicle to follow in line with the front end. It is also well known that driven wheels skid easily on slippery surfaces, but front driven wheels can be quickly brought out of a skid by increasing their driven speed whereas this is not true of rear driven wheels. A tire blowout on front driven wheels is less dangerous than it is with front wheels which are not driven because the force tending to steer the car toward the disabled side is counteracted by the tractive effort of the driven wheels.

From the standpoint of comfort, the arrangement of the engine behind the passengers makes engine noise, vibration, heat and fumes less noticeable than they are with the engine in advance of the passengers.

From the standpoint of performance, the front drive car has tractive advantages over a rear drive car in mud, sand, or snow because the steering wheels furnish the traction and they drive in turning just as well as when the vehicle is traveling in a straight line. When steering out of ruts and off of street car tracks, driven steering wheels perform far superior to steering wheels which are not driven. By the use of front driven wheels and an engine mounted at the rear, performance is improved because the body design can be made more nearly aerodynamically correct than when the engine is at the front of the car and the longitudinal balance can be more nearly correct because the forward location of the seats is not restricted by the engine.

These advantages of a rear engine front drive vehicle have been long recognized by automotive engineers but they have heretofore been unable to produce such a vehicle having the proper balance, and an object of this invention resides in the arrangement of motor vehicle parts whereby the center of gravity is located at a point sufficiently forward of the vehicle to properly balance the same without the employment of useless weight.

Another object of the invention is to provide a rear engine vehicle in which a majority of the engine accessory devices are arranged at the forward end to obtain longitudinal vehicle balance.

A further object of the invention is to provide a rear engine front drive vehicle in which the power transmission clutch is arranged at the forward end of the vehicle so that engine accessories can be located and driven at the front end of the vehicle without disconnecting the drive when the clutch is out and without an appreciable length of driving mechanism.

Still another object of the invention is to improve the longitudinal balance of a motor vehicle, having the engine located at the rear and driving the front steering wheels, by locating the flywheel and clutch near the front end.

Other objects of the invention will appear from the following description taken in connection with the drawings, which form a part of this specification, and in which:

Fig. 1 is a plan view of a motor vehicle, having the body shown diagrammatically, incorporating my invention;

Fig. 2 is a side elevational view of the same, with the body and wheels shown diagrammatically;

Figure 3:
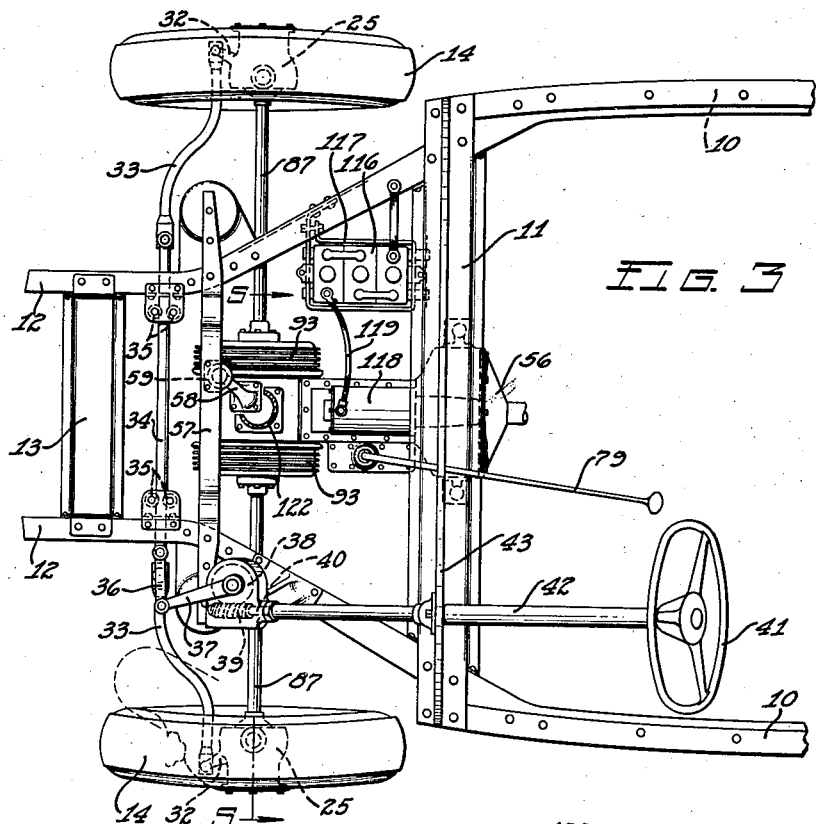
Fig. 3 is an enlarged plan view of the forward end of the vehicle shown in Fig. 1, the body representation and the wheel mounting and suspension being left out.
Figure 4:
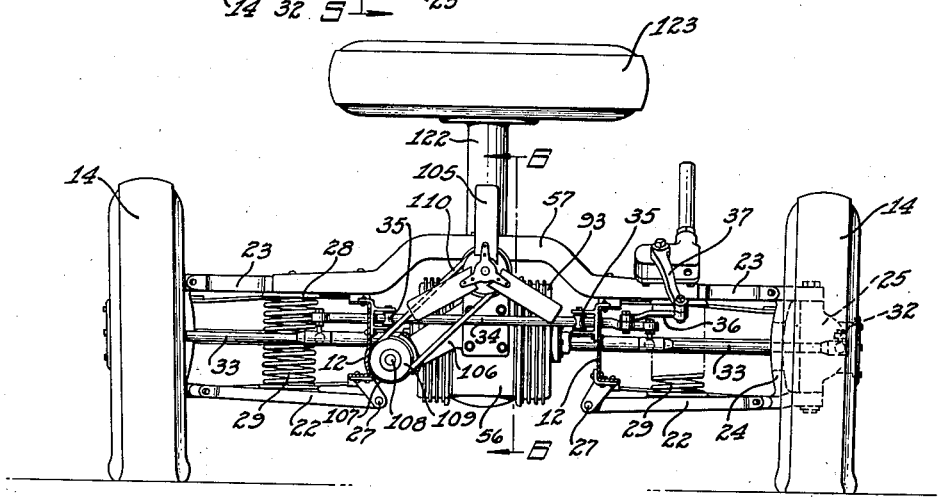
Fig. 4 is a front elevational view of the vehicle with the body removed.
Figure 5:
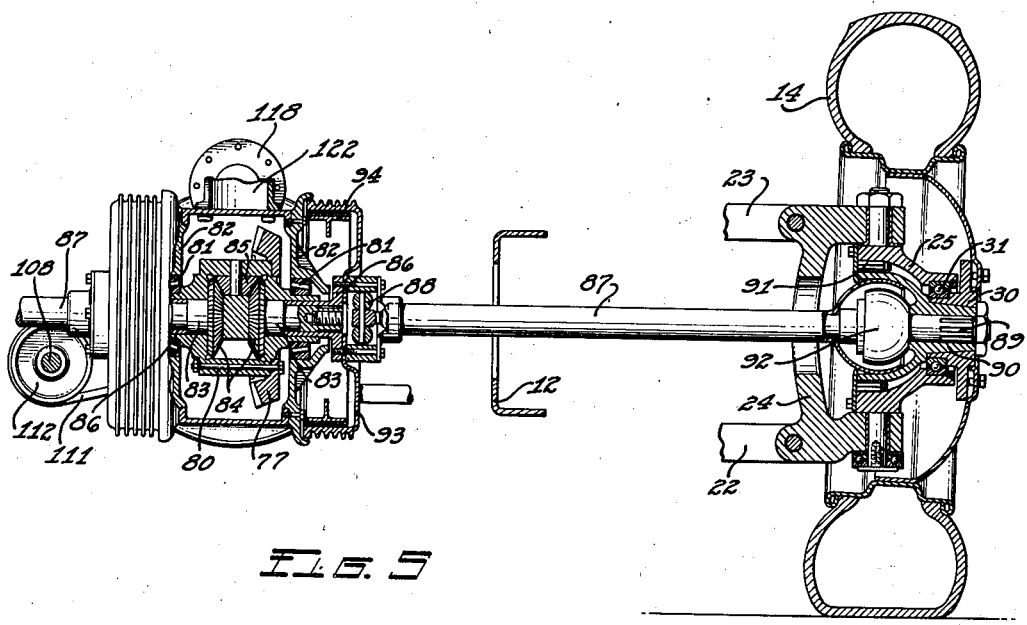
Fig. 5 is a sectional view taken on line 5—5 of Fig. 3 showing a portion of the driving mechanism associated with one of the steering wheels.
Figure 6:
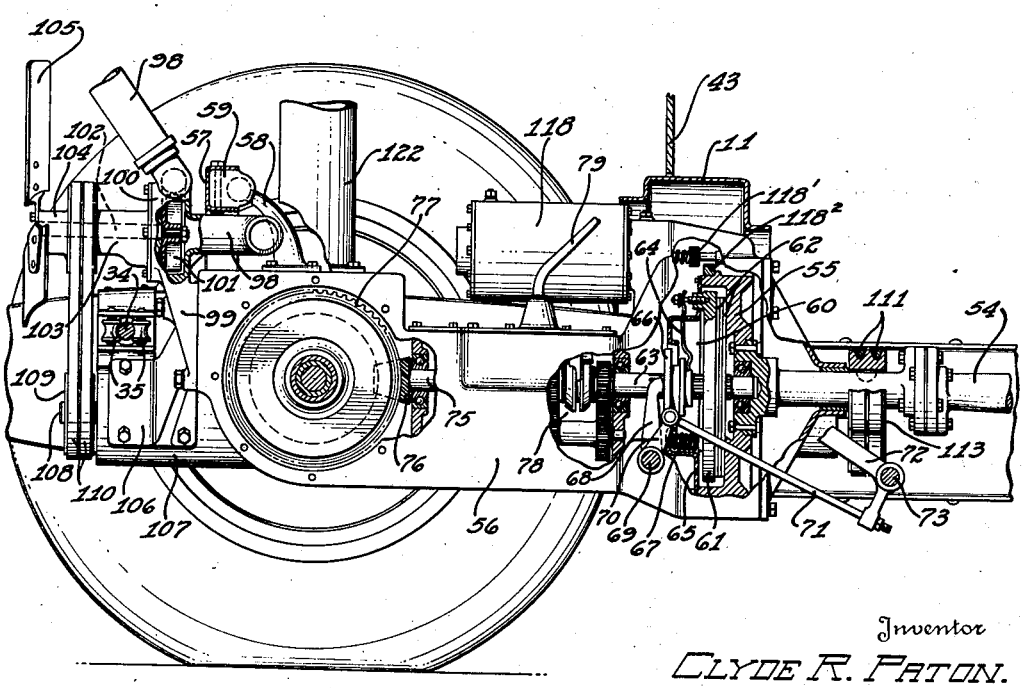
Fig. 6 is a longitudinal sectional view taken on line 6—6 of Fig. 4 showing the forward portion of the vehicle and the arrangement therewith of the driving means and some of the engine accessories.

Referring now to the drawings by characters of reference, the load carrying means or frame is comprised of a pair of side sills 10, cross members 11 joining the end portions of the sills, another pair of side sills 12 co-extensive with the side sills 10 and projecting beyond the ends thereof in a relatively close relation with the extended portions, and transversely extending brace members 13 connecting the extended ends of the sills 12.

Such load carrying means is supported on a pair of front wheels 14 and a pair of rear wheels 15, the wheels being arranged exteriorly of the adjacent portion of the load carrying means.

These wheels are preferably independently mounted, the rear wheels being mounted on carriers 16 each having a spindle at the rear end and a pair of forwardly extending arms. The arms terminate in bearings 17 extending transversely of the frame which are pivotally secured to bracket means 18 projecting rearwardly from the rear cross member 11. Spanning the arms of each carrier are plates 19 which align vertically with plates 20 carried by the side sills 12 and intermediate such aligned plates are coil springs 21. The front wheels are connected with the forwardly extending side sills 12 by pairs of links 22 and 23, the links of each pair being arranged one above the other and connected at their outer ends to a carrier 24 supporting a knuckle member 25. The upper link is shorter than the lower link in each pair and is pivoted at its inner end to the adjacent side sill 12, as indicated at 26, and the lower link of each pair is pivoted to the adjacent side sill 12, as indicated at 27. A plate 28 projects outwardly from each of the forward ends of the sills 12 and a coil spring 29 is located between each plate 28 and the link 22 extending directly thereunder.

Rotatably mounted on the front knuckles are the hub portions 30 of the front wheels, there being a bearing 31 intermediate each hub and knuckle. Suitable steering mechanism is associated with the front wheels for engagement with arms 32 extending forwardly from the knuckles 25. Links 33 are pivoted to the ends of the arms 32 and intermediate such links is a rod 34 pivoted at its ends thereto. The rod 34 extends through suitable openings in the sill member 12 and is guided by rollers 35 carried by suitable brackets on the channel members 12. An arm 36 is pivotally connected to the rod 34 at one end and is pivotally connected to an actuator arm 37 at the other end. Arm 37 is arranged to be oscillated in a direction to operate the arm 36 transversely of the frame in order to move the rod and its connected links in the same direction and thereby rotate the spindles 25 to turn the front wheels for the purpose of steering the vehicle. A gear 38 oscillates the arm 37 and a worm 39 is arranged to drive the gear, the worm being rotated by a shaft 40 having an end extending into the interior of the body with a steering wheel 41 fixed thereto. This shaft 40 passes through a column 42 secured to the dash 43 which extends transversely of the frame and substantially in line with the front cross frame member 11 which is just behind the front steering wheels.

On the rear end of the frame structure is mounted the power plant which, in this instance, is in the form of an internal combustion engine 45. The engine is supported upon a pair of transversely extending brackets 46 which are suitably connected to the rear extended portions of the side sills 12. Substantially the only accessories directly associated with the engine at the rear of the vehicle are the intake manifold 47, the exhaust manifold 48, the exhaust outlet tube and muffler 50, the carburetor 49, the distributer 51 and oil circulating means (not shown).

Between the engine and the front wheels I provide driving means. This driving means is of such a character that the major portion of its weight is at the forward end of the vehicle and the arrangement is such that a drive can be maintained to engine accessories at the forward end of the vehicle irrespective of the position of the clutch. At the forward end of the crankshaft 52 is fixed a relatively light weight flywheel section 53 and secured to this flywheel section is a propeller shaft 54 which extends forwardly of the vehicle to a point adjacent the front wheels. On the forward end of the propeller shaft is mounted a flywheel section 55 which is materially heavier than the rear flywheel section.

Between the flywheel section 55 and the front wheels is arranged the transmission mechanism portion of the drive means which is carried mainly by the housing 56. The housing 56 is pivotally mounted at two points on its rear end to the front cross brace member 11 and is pivotally mounted at a single point on its forward end to a transversely extending brace member 57 which is secured on top of the forward ends of the side sills 12. An arm 58 is fixed to the top wall of the transmission casing and terminates in a ball end which is suitably mounted in a bracket 59 fixed to the brace member 57. This transmission casing projects longitudinally across a line defined by the axes of the front steering and driving wheels. The flywheel section 55 is closed within the transmission housing and associated with the flywheel section is a clutch, indicated generally at 60, which comprises a pressure plate 61 arranged to clamp driving plates 62 against the flywheel section 55, such plates being splined upon a rearwardly extending portion of a drive shaft 63. The pressure plate is released by fingers 64 which rock against the cover plate 65 when the inner ends thereof are moved rearwardly by the clutch collar 66, coil springs 67 engaging the cover plate and the pressure plate to normally move the latter to drivingly engage the friction plates 62 with the flywheel section 55. A yoke 68 is mounted on shaft 69 carried by the transmission housing and is rocked by an arm 70. This arm is connected with a link 71 associated with a bell crank lever 72 supported on a shaft 73 which is carried by one of the frame side sill members. The bell crank lever extends through the floor board of the body and has a pedal 74 fixed to the end thereof.

A driven shaft 75 extends forwardly in the transmission casing from the clutch and carries at its front end a gear 76 which meshes with the differential ring gear 77. Suitable gearing is provided between the driving shaft 63 and the driven shaft 75 as indicated at 78 for transmitting power at several speed ratios, such gearing being of a conventional form and controlled by the change speed lever 79 which extends from the top of the transmission casing into the interior of the vehicle body adjacent the steering column. The ring gear 77 is fixed to the differential housing 80 which is suitably supported by bearings 81 mounted in webs 82 forming a part of the transmission casing. Shafts 83 extend through such webs and the differential housing and have gears 84 fixed to the inner ends thereof which mesh with pinions 85 rotatably mounted in the differential housing. A shaft section 86 is keyed to each of the shafts 83 and drive shafts 87 are flexibly connected by the joints 88 with the shaft sections 86. The outer ends of the shafts 87 extend into the knuckle members 25 of the front wheels and are connected with stub shafts 89 which have the wheel hub carriers 90 keyed thereto. A suitable bearing 91 is provided between the hub carrier and the hub and a suitable joint 92 is provided between each of the drive shafts 87 and the stub shafts 89. Brake drums 93 are fixed to the shaft sections 86 and suitable brake means 94 are arranged within the brake drums and are arranged to be operated by conventional mechanism connected with the pedal 95 adjacent the clutch pedal, booster means, as indicated at 96, being associated as a part of the brake operating mechanism. This driving mechanism is such that the front wheels will be driven in any position of their vertical or steering movement.

A radiator 97 is carried on the front frame brace 13 and conduit means 98 connects the radiator with the engine, the intermediate portion of this conduit means being broken away. Interposed in the conduit means I provide cooling fluid circulating mechanism. A bracket 99 is secured to the front of the transmission casing and is formed with a housing portion 100 within which is arranged a pump 101. The pump is fixed on shaft 102 which extends forwardly through a casing 103 fixed to the front end of the pump casing. A fan hub 104 is fixed to the forward end of the shaft 102 and on the hub is fixed a fan 105.

A bracket 106 is fixed to the forward end of the transmission casing for carrying the generator 107. A shaft 108 extends through the generator and carries a pulley 109 at its forward projecting end which is in alignment with the fan hub 104 in order that a driving belt 110 can extend around the same to drive the fan and the water pump. The drive shaft 108 extends parallel with the propeller shaft and to the rear of the flywheel section 55 in order that a driving belt 111 can extend around a pulley 112 thereon and a pulley 113 fixed on the propeller shaft 54.

By this arrangement of the drive means for the generator and the water pump, release of the clutch will not discontinue operation thereof and this result is accomplished without an extended driving means leading the length of the vehicle. Due to such arrangement I am able to locate the generator, the fan and the water pump at an end of the frame remote from the engine and such accessories serve to assist in counterbalancing the engine. The forward arrangement of the flywheel also adds considerable weight which serves as a counterbalancing effect for the engine and thus assists in providing for the proper balancing of the vehicle longitudinally. The transmission casing and mechanism being at the forward end of the vehicle also assist materially in counterbalancing the weight of the engine and, in addition to this, the dash can be arranged at an extreme forward position which is directly behind the front wheels and thereby permits the front seat or seats 114 to be located well forward and likewise the rear seat or seats 115 whereby the weight of the passengers will also assist in counterbalancing the weight of the engine.

In addition to the means for counterbalancing the engine mentioned in the preceding paragraph, I propose to further counterbalance the engine by arranging the battery 116 adjacent the transmission casing and supported by a carrier means 117 fixed to the forward end of the vehicle frame.

In addition to this, I also locate and secure the starter mechanism 118 upon the transmission case in a relation such that the gear 118' can be placed in driving relation with the ring gear 118² on the front flywheel section. Suitable wiring 119 connects the battery with the starter and the starter can be controlled and functions in its relation with the flywheel section in the usual manner. Above the transmission case I propose to provide a partition 120 above which is arranged the gasoline containing tank 121 and a spare wheel 123, the wheel being supported on a pedestal 122 fixed on the transmission casing. The front end of the vehicle is enclosed by a suitable bonnet 124 which can be of a design conforming to the best principles of aerodynamics. The arrangement of the gasoline tank and the spare wheel also materially increase the weight at the forward end of the vehicle and thus serve to counterbalance the weight of the engine so that the vehicle will be in proper balance longitudinally.

A suitable body structure, as indicated at 125, is arranged to close the space between the bonnet and the engine, such body providing accommodation for seats and the passengers. At the rear end of the vehicle I propose to provide another removable bonnet 126 for enclosing the engine and this bonnet can also be of a design suitable for obtaining the best results aerodynamically.

The carburetor 49 is controlled by the usual linkage 127 which extends to an accelerator pedal 128 located in the body adjacent the brake pedal 95. It will also be understood that the battery is connected with the distributer by suitable wiring as indicated at 129 and that the generator is connected with the battery and the wiring 129 by a connection 130.

The conduit 131 leads from the space below the partition 120 through the dash 43 and establishes communication so that air warmed by the transmission mechanism will flow into the body and thus an efficient heating and ventilating system is provided without the danger from the fumes surrounding the engine.

By this novel form and arrangement of driving means and the arrangement of engine accessories and the spare tire at the forward end of the vehicle, I am able to obtain a proper vehicle balance longitudinally so that efficient performance, comfort and greater safety can be obtained.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A motor road vehicle comprising a load carrying means, front and rear wheels supporting said load carrying means, a power plant at one end of the carrying means, engine accessories at the opposite end of the carrying means from the power plant, such arrangement of the accessories relative to the power plant serving to assist in the longitudinal balancing of the vehicle, drive mechanism between the power plant and the wheels at the opposite end of the load carrying means therefrom, said mechanism including a clutch adjacent the driven wheels, and drive means between the engine accessories and a portion of the driving mechanism between the engine and the clutch.

2. In a motor road vehicle having wheels at each end, drive mechanism comprising a power plant at one end of the vehicle, a flywheel at the opposite end of the vehicle from the power plant, a second flywheel adjacent the power plant and driven thereby, a propeller shaft connecting the flywheels, clutch means associated with the first mentioned flywheel, and driving means between the clutch and the wheels at the same end of the vehicle.

3. In a motor vehicle having a pair of wheels adjacent each end thereof, driving mechanism for the front pair of wheels comprising a power plant located at the rear of the vehicle, a light weight flywheel at the forward end of the power plant and connected to be rotated thereby, a flywheel at the forward end of the vehicle, a propeller shaft connecting the flywheels, and means driven by the forward flywheel for driving the front pair of wheels.

4. A motor road vehicle comprising a frame, front and rear wheels carrying the frame, an engine carried adjacent one end of the frame, engine driven mechanism for driving the wheels at the end of the frame opposite the engine having a clutch adjacent the driven wheels, a fan adjacent the wheels, and driving means between the fan and a portion of said mechanism between the engine and the clutch.

5. A motor road vehicle comprising a frame, front and rear wheels on which said frame is supported, an engine at one end of the vehicle, engine operated means for driving the wheels at the opposite end of the vehicle from the engine including a clutch adjacent the driven wheels, a water cooling and circulating means including a pump supported on the frame and adjacent the driven wheels, a pump drive connected with the wheel drive between the engine and the clutch, and fluid connections between the engine and the cooling and circulating means.

6. A motor road vehicle comprising load carrying means, front and rear wheels supporting the load carrying means, an engine mounted at the rear end portion of the load carrying means, driving mechanism between the engine and the front wheels having a clutch adjacent the driven wheels, a fan and a water pump of the engine cooling system mounted on the end of the load carrying means adjacent the driven wheels, and driving means between the fan and water pump and the driving mechanism adjacent the clutch but between the clutch and the motor.

7. A motor road vehicle comprising load carrying means, front and rear wheels supporting the load carrying means, an engine mounted at the rear end portion of the load carrying means, driving means between the engine and the front wheels having a clutch in the forward portion thereof, a generator shaft driven directly from the live portion of the clutch, and a fan fixed to the shaft.

8. A motor road vehicle comprising load carrying means having front and rear supporting wheels, an engine mounted on the rear portion of the load carrying means, driving means between the engine and the front wheels having a clutch in the forward portion thereof, a generator and fan shaft, a driving connection between the shaft and the live portion of the clutch, a pump, and a drive connection between the pump and the shaft.

9. A motor vehicle comprising a frame, front and rear wheels connected to support the frame, an engine mounted on the rear of said frame, power transmission means between the engine and the front wheels having the main weight thereof adjacent the front wheels, said transmission means including a forwardly extending driving portion, a clutch and a driven portion, engine accessories at the front end of the frame, drive connections between the accessories and the driving portion of the transmission means, and control means for the transmission means and the accessories arranged at the forward end of the frame, said engine accessories being of a major character, the arrangement of said accessories, drive means and controls balancing the vehicle longitudinally.

10. A motor vehicle comprising a frame, wheels suspended from the front and rear side portions of the frame, an engine carried by the rear portion of the frame, drive mechanism having a clutch adjacent the forward end thereof connecting the engine with the front wheels, a generator carried at the forward end of the frame, and a driving connection between the generator and the portion of the drive mechanism between the engine and the clutch.

11. A motor vehicle comprising a frame having front and rear supporting wheels, an engine at one end of the frame, drive means extending from the engine to the wheels at the opposite end of the frame, said drive means including a clutch adjacent the driven wheels, a generator shaft adjacent the end of the frame with which the driven wheels are connected, a shaft having a fan and a pump fixed thereto, driving means between the generator shaft and the fan and pump shaft, and driving means between the generator shaft and a portion of the driven means adjacent the clutch but on the side nearest the engine.

12. A motor road vehicle comprising a load carrying means having front and rear supporting wheels, an engine on the rear portion of the said means, a drive means between the engine and the front wheels including a forwardly extending drive shaft and a flywheel at the front portion of said shaft, and a starter device carried on the forward end of the load supporting means in a relation to engage and rotate the flywheel, the position of said flywheel and said starter relative to the engine serving to assist in balancing the vehicle longitudinally.

13. A motor road vehicle comprising a load carrying means having front and rear supporting wheels, an engine at the rear end of said means, an electric engine starting device at the front of said means, drive means connecting the engine with the front wheels having a flywheel adjacent the starting device, and a clutch between the flywheel and the front wheels and driving means for connecting the starting device with the flywheel, the positions of said starting device, said flywheel and said clutch relative to said engine serving to assist in balancing the vehicle longitudinally.

14. A motor road vehicle comprising a frame, front and rear wheels carrying said frame, an engine at one end of said frame, driving mechanism between said engine and the wheels at the opposite end of said frame including a clutch, a generator on the frame and adjacent the driven wheels, and drive means between the generator and a portion of the driving mechanism adjacent thereto between said engine and said clutch, the position of said clutch and said generator relative to the engine serving to assist in the longitudinal balance of the vehicle.

15. In a motor road vehicle having a pair of oppositely disposed wheels adjacent each end thereof, drive mechanism comprising a power plant adjacent one pair of said wheels, and drive mechanism associated to connect the power plant and the pair of wheels at the opposite end of the vehicle from the power plant, said last mechanism including two flywheels located one adjacent each pair of wheels.

16. A motor road vehicle comprising a frame, front and rear pairs of wheels supporting the frame, an engine at one end of the frame, an accessory at the other end of the frame from the engine, a live shaft extending from the engine to a point adjacent the accessory, a driving connection between the live shaft and the accessory, change speed transmission means disposed adjacent the end of the live shaft remote from the engine, said transmission being connectible to drive the pair of wheels at the accessory end of the frame, and clutch means between the live shaft and the transmission means.

17. A motor vehicle comprising a frame, wheels suspended from the front and rear side portions of the frame, an engine carried by the rear portion of the frame, drive mechanism having a clutch and disposed adjacent the forward end of the frame for connecting the engine with the front wheels, an accessory carried at the forward end of the frame, and a driving connection between the accessory and the portion of the drive mechanism between the engine and the clutch.

18. A motor road vehicle comprising a load carrying means, a pair of oppositely disposed wheels at the front and rear portions of the vehicle supporting the load carrying means, an engine supported on the rear end of the load carrying means, said engine having a crank shaft, a propeller shaft extending toward the front end of the load carrying means, a positive driving connection between the crank shaft and the propeller shaft, a driving connection including a clutch between the front end of the propeller shaft and the front pair of wheels, and an accessory driving means driven from the front portion of said propeller shaft at a point between said engine and said clutch.

19. A motor road vehicle comprising load carrying means supported by pairs of front and rear wheels, an engine mounted on the rear end of said means, drive means connecting the engine with the pair of wheels at the front end of the carrying means, said drive means having therein a longitudinally extending propeller shaft and a flywheel on the front end of the shaft, and a body on said load carrying means having a dash and seats therein, said dash and seats being limited as to forward position only by the flywheel, the location of said flywheel and said body relative to said engine serving to assist in the longitudinal balancing of the vehicle.

20. A motor road vehicle comprising load carrying means supported by pairs of front and rear wheels, an engine mounted on the rear end of said means, drive means connecting the engine with the pair of wheels at the front end of the carrying means, said drive means having therein a longitudinally extending propeller shaft, a flywheel and a clutch on the front end of the shaft, and a body on said load carrying means having a dash and seats therein, said dash and seats being limited as to forward position only by the flywheel, the location of said flywheel, said clutch and said body relative to said engine serving to assist in the longitudinal balancing of the vehicle.

21. A motor road vehicle comprising load carrying means supported by pairs of front and rear wheels, an engine mounted on the rear end of said means, drive means connecting the engine with the pair of wheels at the front end of the carrying means, said drive means having therein a longtudinally extending propeller shaft, a flywheel on the end of the shaft remote from the engine, a clutch associated with said flywheel, and a change speed transmission mechanism located on the side of said clutch remote from said engine, and a body on said load carrying means having a dash and seats therein, said dash and seats being limited as to forward position only by the flywheel, the location of said flywheel, said clutch, said transmission mechanism and said body relative to said engine serving to assist in the longitudinal balancing of the vehicle.

CLYDE R. PATON.